12-16-1873
Re 5,688
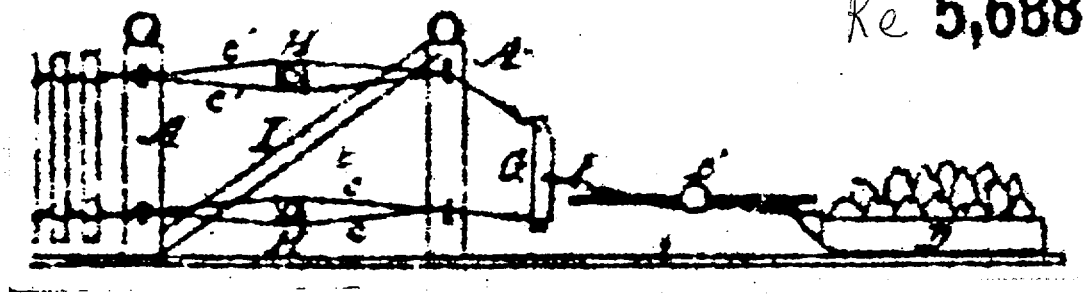

UNITED STATES PATENT OFFICE.

JOSHUA W. RAPPLEYE, OF FARMER VILLAGE, NEW YORK.

IMPROVEMENT IN CONSTRUCTING WIRE FENCES.

Specification forming part of Letters Patent No. 116,755, dated July 4, 1871; reissue No. 5,688, dated December 16, 1873; application filed May 22, 1872.

*To all whom it may concern:*

Be it known that I, JOSHUA W. RAPPLEYE, of Farmer Village, Seneca county, New York, have invented certain Improvements in Constructing Wire Fences, of which the following is a specification:

My invention relates to that class of wire fences in which palings or pickets are interwoven with double strands of wire at top and bottom. The invention consists, first, in the combination of a movable weight or resisting attachment, a windlass, and a double-tree or evener, or its equivalent, the same being arranged so as to operate upon the upper and lower strands of wire, for the purpose of maintaining equal tension and adjustment to the taking up of the wires while weaving in the pickets or palings; second, in the combination of a weight and a double-tree or evener, (with or without hand-levers to operate upon the wires,) for obtaining a uniform and equal tension while weaving in the pickets or palings; third, in the combination of a double-tree or evener and a windlass, arranged so as to operate upon the wires, in order to secure a proper and uniform tension while the pickets or palings are being interwoven with the strands during the construction or erection of the fence; fourth, in a sheath or holder combined with an open-headed spike or hook, to receive and support the wires upon the posts, and also prevent a vibrating contact of the wires with the hooks.

In the accompanying drawing, Figure 1 is an elevation of the fence, and the apparatus used in the construction of the same; Fig. 2, a plan view; Figs. 3 and 4, detail views, showing the device for connecting the wires with the posts.

A A represent the posts, which may be of any desired number, according to the length of the fence. To one of the end posts the sets of wires *c c* and *c′ c′*, consisting of two strands, are attached, respectively, at top and bottom. These strands are carried any desired length through loose atachments of the intermediate posts, and beyond the outer end post, where they are attached to the top and bottom, respectively, of a double-tree or evener, G. To the center of the double-tree is attached a cable, F, or equivalent, which winds upon a windlass, E. This windlass, in turn, is connected with a yielding resistance, which yields or draws up as the wires are taken up by the interweaving of the palings. The device I find most convenient to employ (as it is almost always kept on a farm) is a stone-boat, D, loaded with stone until the right resistance is attained. Hand-levers H H are inserted between the strands of the sets of wires, and are turned and twisted alternately one way and then the other in weaving in the palings *b b*.

The operation is as follows: The wires being attached and connected with the working apparatus, as above described, the windlass is turned up until the wires are made perfectly straight and taut. The strands of each set of wires are then crossed at the starting-point, and a picket or paling is inserted next to the crossing. The levers H H are then turned in the opposite direction, and another picket is inserted. This process is carried on till the whole length of the fence is completed. As fast as the wires are taken up, the compensation is made by the yielding or drawing up of the weight D, which is gaged to the proper resistance, and thus the wires are kept under automatic tension, which is always equal and uniform, and which is just sufficient to bind the palings properly in place, and form a strong and substantial fence. Any inequality in the taking up between the upper and lower wires by the unequal thickness of the opposite ends of the palings is compensated for by the double-tree or evener G, which will incline one way or the other, as the case may be, and yet will hold equal tension on both sets of wires under all circumstances.

This is a feature of the utmost importance in the construction of a fence of this kind, since all pickets vary more or less in thickness at the opposite ends, and it enables me to use any and all kinds of pickets, even if riven from the wood or cut from irregular sticks. It is impracticable to build a perfect fence of this kind without the use of this double-tree, and for this reason I regard it as one of the essential features of my invention.

The hand-levers H H are also quite important, since the wires are under great tension, and cannot be crossed, so as to fit closely to and bind upon the pickets, simply by taking hold of them by the hands. By the use of these levers, as described, the crossings of the wires can be bound close to the pickets, and even be made to sink into the wood, and therefore prevent slipping of the pickets.

Another feature, quite as important, is the self-acting tension upon the wires produced by the weight D, or equivalent. By its use the tension is always equal and uniform, and there is no spasmodic action, such as results from the use of a windlass that pays out by hand. The latter is liable to release too much or too little, and can never be graded to the tension desired, while the movable weight never releases its uniform hold, and never produces a stoppage, the result being a perfect fence which sustains by tension the whole length, without any attachments except the posts.

In order to brace the end posts of a length of fence, I employ braces I, which rest against the top of the end post and against the bottom of the next post, as shown in Fig. 1. It is obvious from the above that the tendency might be to cut or abrade the wires when they pass the intermediate posts. To avoid this I employ sheaths or holders *l l*, through which the wires pass, and prevent their coming in contact with a sharp edge. These sheaths consist of sheet metal, or equivalent, bent to the proper shape, and project a suitable distance each side of the attachment or support, which is secured to the post.

I prefer to make the attachments in the form of open-headed bolts J, as shown in Figs. 3 and 4, which are driven into the posts.

I claim as my invention—

1. The combination of a movable weight, D, the windlass E, and double-tree or evener G, or its equivalent, to operate upon the wires *c c c′ c′*, for maintaining equal tension and adjustment to the taking up of the wires while weaving in the pickets or palings *b*, substantially in the manner herein shown and described.

2. The combination of a movable weight, D, and double-tree or evener G with the hand-levers H, to operate upon the wires *c c c′ c′*, for maintaining tension upon the wires, and twisting or crossing the same while weaving in the pickets, substantially as described.

3. The double-tree or evener G, in combination with the windlass E, for obtaining uniform tension on the wires *c c c′ c′* while weaving in the pickets or palings, substantially as described.

4. The sheath or holder *l*, in combination with the open-headed spike or hook J, to receive, support, and protect the wires *c c c′ c′*, substantially as described.

In testimony that I claim the foregoing I have hereunto set my hand and seal this 19th day of December, 1873.

JOSHUA W. RAPPLEYE. [L. S.]

Witnesses:
JAMES C. KNIGHT,
D. C. WHEELER.